United States Patent
Veale et al.

(10) Patent No.: US 11,995,172 B2
(45) Date of Patent: *May 28, 2024

(54) ACCELERATOR ACCESS CONTROL

(71) Applicant: International Business Machines Corporation, Armonk, NY (US)

(72) Inventors: Brian Frank Veale, Cedar Park, TX (US); Bruce Mealey, Austin, TX (US); Andre Laurent Albot, Austin, TX (US); Nick Stilwell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,194

(22) Filed: Apr. 5, 2023

(65) Prior Publication Data

US 2023/0237145 A1    Jul. 27, 2023

Related U.S. Application Data

(63) Continuation of application No. 16/131,982, filed on Sep. 14, 2018, now Pat. No. 11,663,312.

(51) Int. Cl.
*G06F 21/44* (2013.01)
*G06F 13/40* (2006.01)

(52) U.S. Cl.
CPC .......... *G06F 21/44* (2013.01); *G06F 13/4022* (2013.01)

(58) Field of Classification Search
CPC ...... G06F 21/44; G06F 13/4022; G06F 21/52; G06F 21/577

See application file for complete search history.

(56) References Cited

U.S. PATENT DOCUMENTS

| | | | |
|---|---|---|---|
| 8,788,787 B2 | 7/2014 | Mott et al. | |
| 9,043,923 B2 | 5/2015 | Kruglick | |
| 9,575,825 B2 | 2/2017 | Arimilli et al. | |
| 9,760,386 B2 | 9/2017 | Hollinger | |
| 9,766,890 B2 | 9/2017 | Arimilli et al. | |
| 9,836,316 B2 | 12/2017 | Wang et al. | |
| 2011/0010721 A1* | 1/2011 | Gupta | G06F 9/5077 718/1 |

(Continued)

OTHER PUBLICATIONS

Bhattiprolu; "[v8,00/10] Enable VAS"; URL: https://patchwork.ozlabs.org/cover/806952/; Aug. 29, 2017; 6 pages.

(Continued)

*Primary Examiner* — Shin-Hon (Eric) Chen
*Assistant Examiner* — Vladimir I Gavrilenko
(74) *Attorney, Agent, or Firm* — Cantor Colburn LLP; Kelli D. Morin

(57) ABSTRACT

Accelerator access control whereby an application's access to an accelerator is revoked in order to allow the system to perform a system function. In one or more embodiments, when an application is executing, a credit system is utilized to provide credits for controlled access to the accelerator. When request information is received to remove access to a credit associated with the application's access to the accelerator, the credit is marked to fail with operating system interfaces. Also, in one or more embodiments, if the credit is in use for accessing the accelerator, an effective address associated with the credit is unmapped from the accelerator.

3 Claims, 5 Drawing Sheets

(56) References Cited

U.S. PATENT DOCUMENTS

| | | | |
|---|---|---|---|
| 2015/0089495 A1* | 3/2015 | Persson | G06F 9/45558 |
| | | | 718/1 |
| 2016/0156598 A1* | 6/2016 | Alonso Cebrian | |
| | | | H04L 63/0861 |
| | | | 713/168 |
| 2016/0173693 A1* | 6/2016 | Spievak | G06Q 30/0269 |
| | | | 379/265.09 |
| 2018/0052688 A1 | 2/2018 | Arimilli et al. | |
| 2019/0044951 A1 | 2/2019 | Zivkovic | |
| 2019/0130094 A1 | 5/2019 | Votaw et al. | |
| 2019/0251273 A1 | 8/2019 | Slik | |
| 2019/0258818 A1* | 8/2019 | Yu | G06F 21/44 |
| 2019/0303297 A1* | 10/2019 | Fleming, Jr. | G06F 13/1668 |
| 2020/0089865 A1 | 3/2020 | Veale et al. | |

OTHER PUBLICATIONS

IBM: List of IBM Patents or Patent Applications Treated as Related (Appendix P); Date Filed: Apr. 5, 2023; 2 pages.

\* cited by examiner

ACCELERATOR ACCESS CONTROL

BACKGROUND

The invention relates generally to digital computer systems, and more particularly, to computing systems that implement computing accelerators.

Multi-core based computer systems can be used to solve a number of data and/or compute intensive problems. Computers with multiple cores can be used within a data center, server farm, or some other suitable facility. Associated with these cores may be one or more accelerators dedicated to specific computational tasks. For example, various types of accelerators can be employed including, but not limited to, an accelerator Central Processing Unit (CPU), on-chip accelerators, cryptographic accelerators, encoding/decoding accelerators, and network accelerators.

Sometimes access to accelerators needs to be removed. For example, support for system features such as dynamic reconfiguration requires removing accelerator resources from a partition or virtual machine. Live partition, virtual machine migration and live update are also examples requiring removal of accelerator resources. However, without the ability to revoke accelerator resources, system features cannot be supported or will be limited in capabilities while the accelerators continue to be accessed. Thus, while supporting system features, the ability to revoke access to accelerators and ensure that future work requests to the accelerators fail are needed.

SUMMARY

According to a non-limiting embodiment, a method for controlling access to an accelerator installed in a computer system is provided. The method comprises executing, via a processor, an application and utilizing a credit system where credits are made available for controlling access to the accelerator. The method then includes receiving request information to remove access to a credit associated with the application's access to the accelerator and marking the credit to fail upon receiving the request information. The method may also include determining if the credit is in use for accessing the accelerator and, if the credit is in use, unmapping an effective address associated with the credit.

According to another non-limiting embodiment, a method of revoking access to an accelerator is provided. The method includes executing, via a processor, an application and buffering an effective address associated with the accelerator. The method also includes providing an effective address associated with the accelerator and mapping the effective address to a send window associated with the accelerator. The method then includes returning the effective address to the application for use to access the accelerator and, in response to receiving request information to revoke the application's access to the accelerator, unmapping the effective address to the accelerator.

According to another non-limiting embodiment, a computer system configured to control access to an accelerator is provided. The computer system includes a processor configured to execute an application and the accelerator communicates with the processor and is configured to perform a data processing operation in response to request information output from the application. A virtual accelerator switchboard (VAS) communicates with the processor and the accelerator, wherein access to the accelerator is controlled based on an availability of at least one credit. The application's access to the accelerator is revoked by performing at least one of unmapping an effective address to the accelerator wherein the effective address is associated with the at least one credit, and marking the at least one credit to fail with operating system interfaces. The computer system may also include a credit system wherein the at least one credit is made available for controlling access to the accelerator and wherein the at least one credit is marked to fail. Also, the computer system may include a buffer wherein the effective address has been deleted from the buffer in order to unmap the effective address from the accelerator, thereby precluding the application from accessing the accelerator.

According to yet another non-limiting embodiment, a computer program product is provided. The computer program product includes a computer readable storage medium having program instructions embodied therewith, the program instructions executable by a computer processor to cause the computer processor to perform a method. The method includes executing, via a processor, an application, utilizing a credit system where credits are made available for controlling access to the accelerator and receiving request information to remove a credit from providing the application access to the accelerator. The method also includes marking the credit to fail with operating system interfaces upon receiving the request information and determining if the credit is in use for accessing the accelerator. If the credit is in use, the method then includes unmapping an effective address associated with the credit. The method may also include accessing the accelerator through a virtual accelerator switchboard (VAS) wherein the VAS provides send and receive windows for transmitting data between the application and the accelerator and wherein the credits from the credit management system control access to the accelerator via the send and receive windows. Then the method may include copying the request information into a buffer and pasting the request information from the buffer to the accelerator, wherein the request information copied to the buffer includes the effective address identifying where to paste the request information for the accelerator. The method may also then include deleting the effective address from the buffer such that the buffer is no longer mapped to the accelerator, thereby precluding the application from accessing the accelerator.

According to still yet another non-limiting embodiment, a computer program product for controlling access to an accelerator is provided. The computer program product includes a computer readable storage medium having program instructions thereon. The program instructions are executed by a processor to cause the processor to perform a method. A non-limiting example of the method includes executing, via a processor, an application and providing an effective address associated with the accelerator. The method also includes mapping the effective address to a send window associated with the accelerator and returning the effective address to the application for use to access the accelerator. The method also includes, in response to receiving request information to revoke the application's access to the accelerator, unmapping the effective address to the accelerator. The computer program product may also include a credit system wherein a credit associated with accessing the accelerator is marked to fail.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
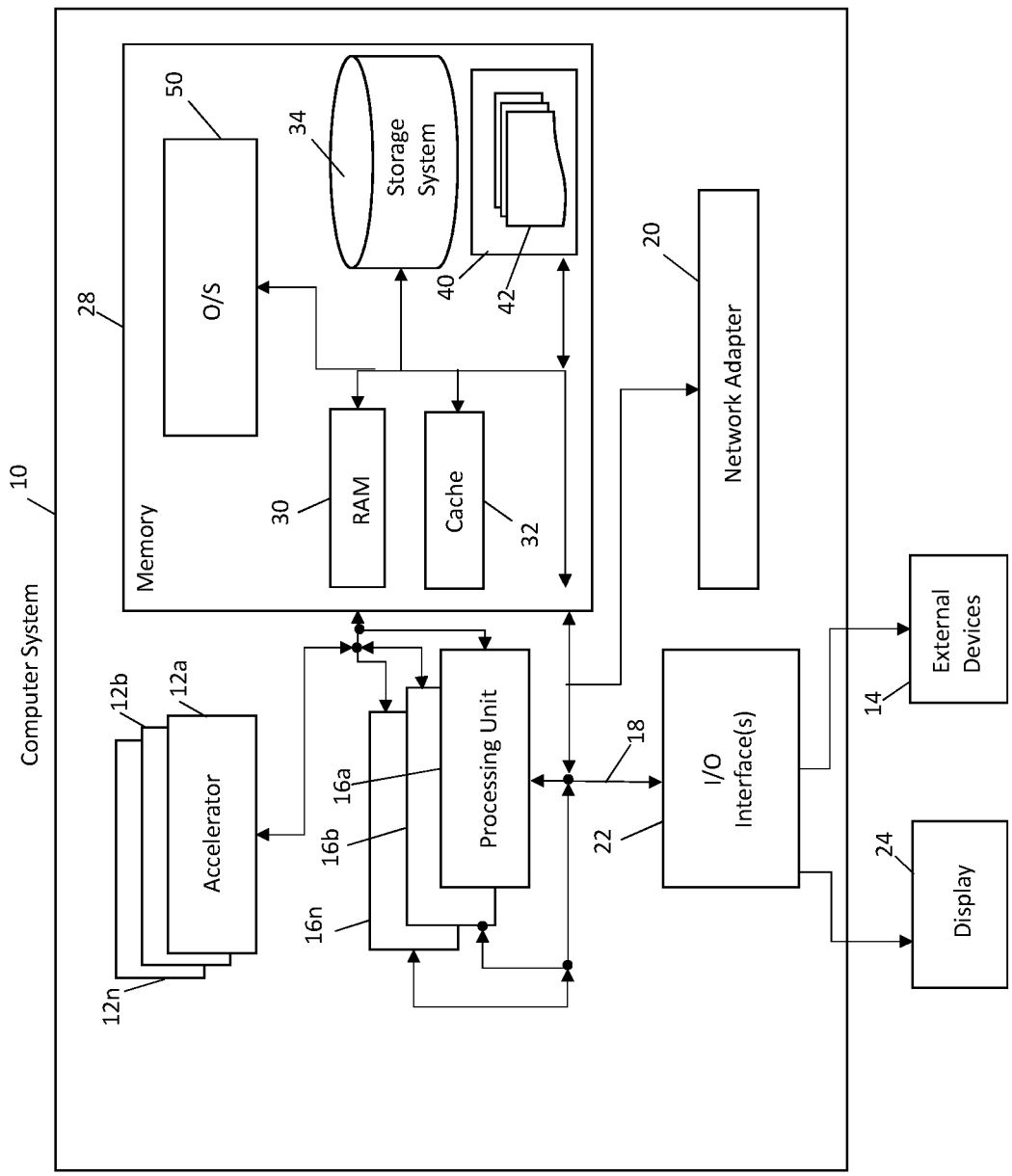
FIG. 1 is a block diagram illustrating a computer system which is capable of controlling access to an accelerator in accordance with various embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern processors can implement an accelerator that can be accessed or invoked via a Virtual Accelerator Switchboard (VAS). In the VAS implementation, an application registers with the operating system (OS) to gain access to an accelerator. The application issues a request including request information to access an accelerator, which is first received by the VAS. The VAS uses send windows and receive windows to transmit data (e.g., access requests, intended function data, data to be processed, etc.) between an application and a receiving accelerator. In order to control access to the send and receive windows, a credit system is used. A send window has a certain number of credits associated with it and if it is out of credits then the request cannot be sent. For example, credits associated with a request in both the send and receive windows are taken away and then returned when the request has been processed by the accelerator. In at least one embodiment described herein, the number of requests that can be sent by an application or received by an accelerator is controlled by the number of credits that are allocated to the send and receive windows. Thus, when the send window does not have send credits or the receive window does not have receive credits, the VAS denies the exchange (e.g., the access request) between the application and the accelerator.

As described herein, one or more embodiments address shortcomings of the prior art by providing a computer system capable of controlling access to one or more accelerators by revoking credits associated with the application gaining access to the accelerator. Particular credits may be marked to fail with the operating system of the computer system or with the application itself and/or a paste addresses may be unmapped to which pastes from the application must be written to.

Referring now to FIG. 1, a computer system 10 capable of controlling access to one or more accelerators 12a-12n (generally referred to herein with reference number 12) is illustrated according to a non-limiting embodiment. In FIG. 1 the computer system 10 is shown in the form of a general-purpose computer device which also may be referred to as a processing device. The components of computer system may include, but are not limited to, the one or more accelerators 12a-12n, one or more processors or processing units 16a-16n (generally referred to herein with reference number 16), system memory 28, and a bus 18 that couples various system components.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include a library API (not shown in FIG. 1). The library API is a software library comprising APIs for performing the data manipulation functions provided by the specialized hardware devices such as, for example, the accelerator 12.

The accelerator 12 is sometimes referred to as a "coprocessor" and typically performs a dedicated computing function including, but not limited to, CPU processes, cryptographic operations and calculations, encoding/decoding processes, and network operations. By off-loading a particular computing function to a dedicated accelerator, the overall computing speed of the computer system can be increased.

The storage system 34 can store a basic input output system (BIOS). The BIOS is a set of essential routines that initialize and test hardware at startup, start execution of the OS 50, and support the transfer of data among the hardware devices. When the computer system 10 is in operation, the processors 16a-16n are configured to execute instructions stored within the storage system 34, to communicate data to and from the memory 28, and to generally control operations of the computer system 10 pursuant to the instructions.

One or more accelerators 12a-12n are in signal communication with each processor 16a-16n, along with the system memory 28, and can operate as a hardware accelerator. In at least one embodiment, each processor 16a, 16b-16n controls a corresponding individual accelerator 12a, 12b-12n. In other words, there is a one-to-one relationship between the number of processors 16a-16n and the number of accelerators 12a-12n. In one or more other embodiments, one or more processors 16a-16n may control more than one of the accelerators 12a-12n.

Each accelerator 12 can apply various functions, such as, but not limited to compression algorithms or decompression algorithms, sometimes referred to as hardware compressions or hardware decompressions, to data or data streams requested by an application, sometimes referred to as a "process" or "thread." Various lossless compression algorithms, for example, can be executed by the accelerator to reduce the size of data or a data stream requested by an application.

Program/utility 40, having a set (at least one) of program modules 42, may be stored in memory 28 by way of example, and not limitation, as well as the OS 50, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, data archival storage systems, etc.

Figure 2:
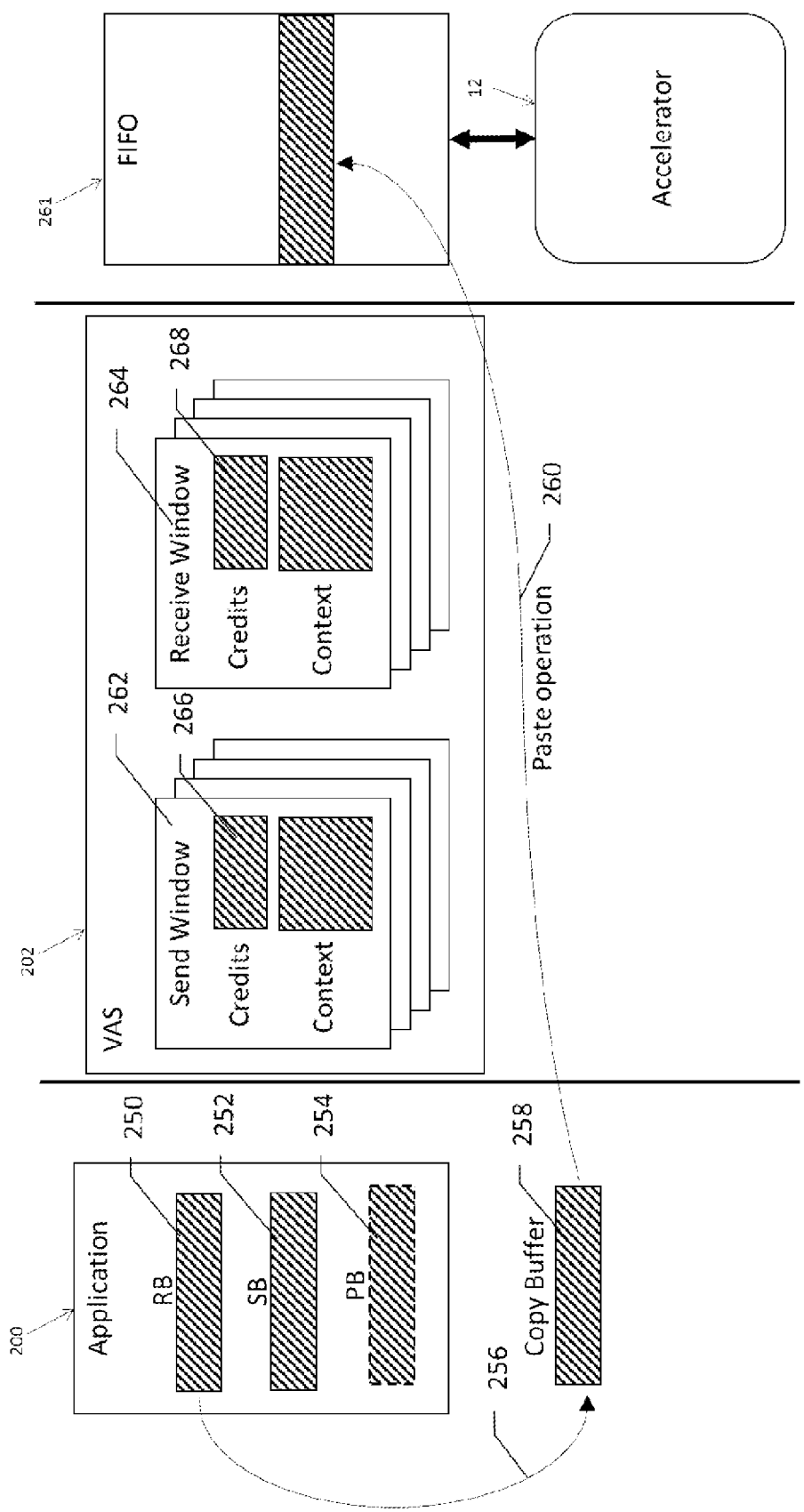
FIG. 2 is a block diagram illustrating communication between an application, virtual accelerator switchboard, and an accelerator according to one or more embodiments of the present invention.

Referring now to FIG. 2, the computer system 10 (e.g., processing unit 16a-16n) is configured to execute one or more applications 200, sometimes referred to as "processes." The application 200 can obtain access to the accelerator 12 via a virtual accelerator switchboard (VAS) 202. In one or more embodiments, the accelerator 12 is configured to operate along with the VAS 202 to perform dedicated cryptographic algorithms and cryptographic computing schemes. The accelerator 12 is also capable of performing, for example, lossless on-chip data compression and decompression operations. The accelerator 12 could also be implemented to perform other operations such as sending data and requests between processors via the VAS.

The application 200 registers with the OS (not shown in FIG. 2) to gain access to the accelerator 12. In return, the application 200 is provided with an effective address (EA) at which to paste a request block (RB) 250. The EA may sometimes be referred to as the paste address (PA).

The RB 250 contains request information including, but not limited to, the function to be performed, the EAs of the source and target data, the length of the source and target data, and the EA of a status block (SB) 252 where completion status will be written by the accelerator 12. Additionally, an optional parameter block (PB) 254 can be provided that defines input and output parameters for a given accelerator 12.

To facilitate a request to an accelerator 12 a copy instruction 256 is issued by either the OS 50 or application which copies the cache-line containing the request information into a copy buffer 258. The buffered data of the request information, including the RB 250 with the PA, is then output as a paste instruction 260 and serves to transfer the contents of the buffer 258 to the PA corresponding to the RB. The paste instruction 260 is received at a queue for the accelerator 12, such as a first-input/first-output (FIFO) buffer 261, which is then delivered to the accelerator 12 associated with the PA in the paste instruction 260. The accelerator 12 processes requests according to the order in which the requests are received in the FIFO buffer 261.

Upon completion of the request by the accelerator 12, a memory controller (not shown) generates PB output data/parameters, a completion code indicating whether the request completed with an error or exception (zero indicates no error or exception condition) and sets a valid bit of the SB. Optionally, an interrupt notification can be sent when the RB has completed.

Still referring to FIG. 2, the VAS 202 uses send windows 262 and receive windows 264 to transmit data between an application 200 and a receiving accelerator 12. In one or more embodiments described herein, the number of access requests that can be sent and received is controlled by a credit system where credits are allocated in order to transmit data via the send and receive windows. In FIG. 2, credits 266 and 268 are allocated to the send and receive windows 262 and 264, respectively. If the send window 262 does not contain send credits 266 or the receive window does not contain receive credits 268, the paste operation 260 will fail, i.e., will be denied by the VAS 202. Each send and receive window 262, 264 may also include a content block with extra or additional information that may be needed for accessing the accelerator 12.

As described herein, various non-limiting embodiments provide a scheme for revoking the application's 200 access to the accelerator 12. It may be necessary to block access to the accelerator 12 in order to perform a feature of the computer system 10. Performing a system feature may sometimes be referred to as a system function. Also, a system feature may also be a maintenance feature of the computer system 10. System features may include, for example, dynamic reconfiguration, virtual machine migration, live update and live migration where one or more of these system functions, or other additional system functions, may each be referred to as virtualization. A system feature may also include preemptive switching of credits from one application to another application wherein the switching is referred to as preemptive in that the application from which credits are being switched from has not yet received any indication that it is losing one or more credits.

Figure 3:
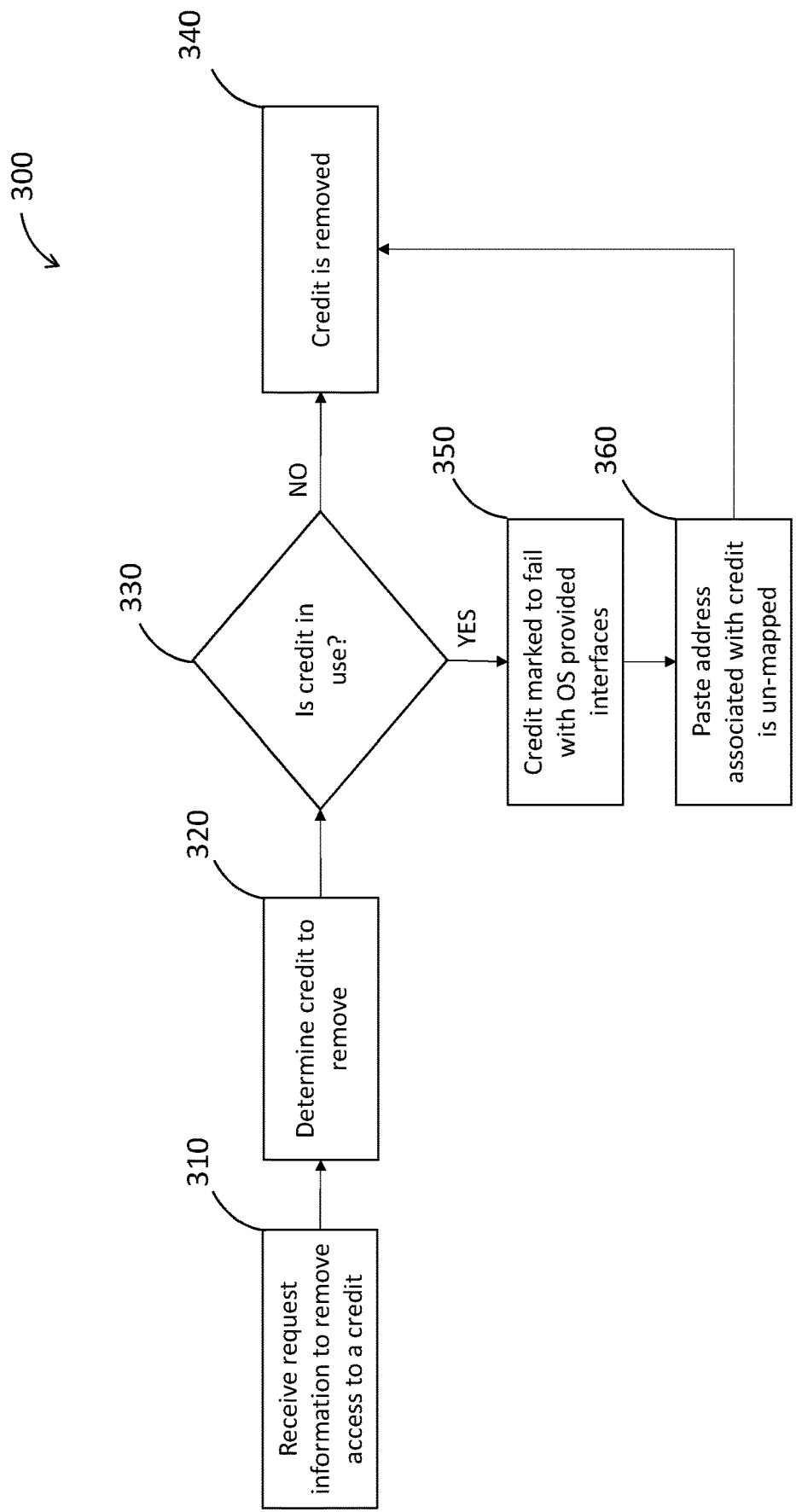
FIG. 3 is a flow diagram illustrating a method of removing credits in order to revoke access to an accelerator according to one or more embodiments of the present invention.

Turning now to FIG. 3, a method 300 for controlling access to an accelerator installed in a computer system is illustrated according to a non-limiting embodiment. In order to perform the system feature, the method includes process block 310 for receiving request information to remove access to a credit such that the application 200 will no longer be able access to the accelerator 12. In process block 320 the method 300 determines which credit or credits to remove in response to having received the request information. For example, the credit/credits to remove could be the credit currently is used for accessing the accelerator 12 by the application 200 from which the request information came.

Also, the credit/credits to remove could be the least used credit, the credit with the lowest number of submitted work requests, the credit with the least frequency of use, or the credit with the lowest quality of service guarantee. Next, the method 300 includes decision block 330 for determining whether a particular credit is in use. If the credit is not in use, the NO branch is followed to process block 340 where the credit is removed.

However, if the credit is in use, the YES branch is followed to process block 350 where the credit is marked to fail with OS 50 interfaces, upon receiving the request information. The process 300 then continues to process block 360 where, if the credit is in use, the EA associated with the removed credit is unmapped by deleting the effective address from the send window 262, thereby precluding the application 200 from accessing the accelerator 12. In other words, once the EA has been invalidated the VAS can no longer identify the send window 262 from the EA and then the VAS rejects the request. From process block 360 the process 300 includes a loop back to process block 340. The VAS may then indicate to the application 200 that the credit has been removed and that access to the accelerator 12 has been revoked.

Figure 4:
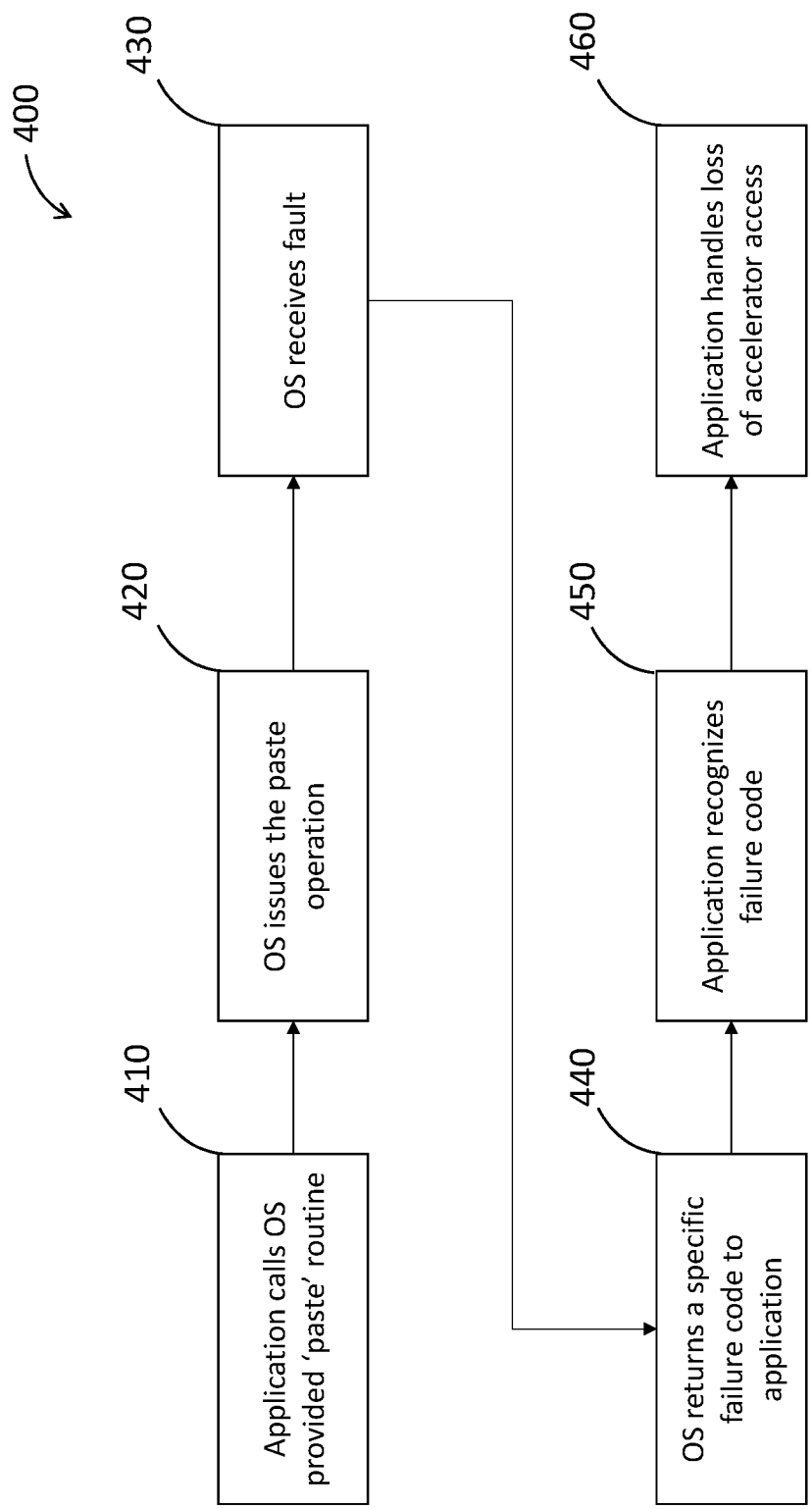
FIG. 4 is a flow diagram illustrating a method for handling failures due to the removal of a credit when operating system mechanisms are used to access the accelerator according to one or more embodiments of the present invention.

FIG. 4 is a flow diagram illustrating a method 400 for handling failures due to the removal of a credit when operating system features are used to access the accelerator according to one or more embodiments of the present invention. The method 400 includes process block 410 where the application 200 calls a paste routine of the OS 50. In this case, the EA referencing the send window has been unmapped as a result of having the application's access to the credit removed as described above in association with FIG. 3. At process block 420 the OS 50 issues the paste operation 260 where the contents of the buffer 258 are to be pasted to the FIFO buffer 261 of the accelerator 12. In other words, the request information copied into the buffer 258 cannot be pasted to the accelerator 12 since the EA referencing the send window 262 has been invalidated. In response, the OS 50 then receives a fault as shown in process block 430. The method 400 then proceeds to process block 440 where the OS 50 returns a specific failure code to the application 200. In process 450 the application 200 recognizes the failure code and at process block 460 the application 200 handles the loss of access to the accelerator 12.

Figure 5:
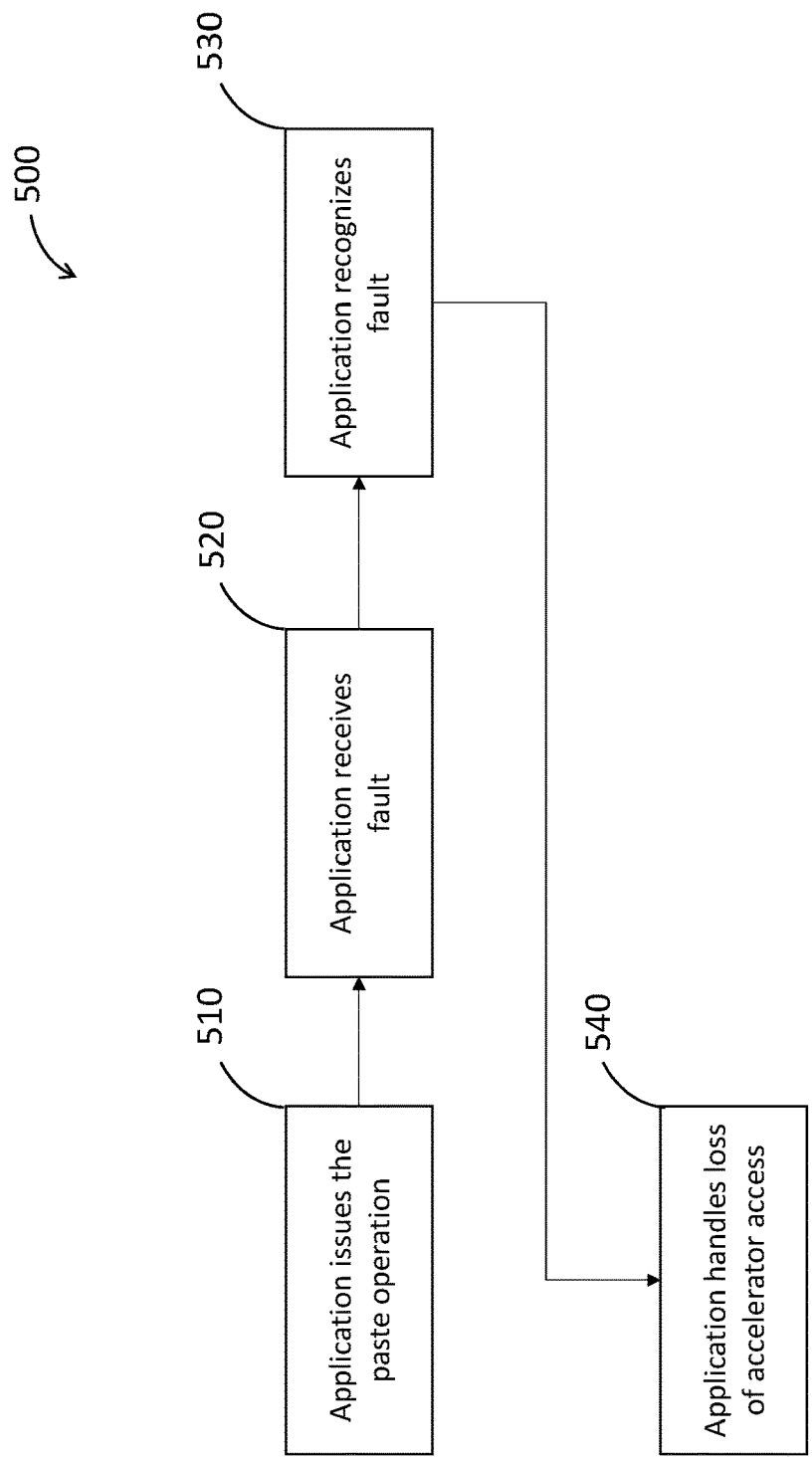
FIG. 5 is a flow diagram illustrating a method of handling failures due to removal a credit when the application itself, rather than the operating system, is used to access the accelerator according to one or more embodiments of the present invention.

FIG. 5 is a flow diagram illustrating a method 500 for handling failures due to the removal of a credit when the application itself, rather than the operating system, is accessing the accelerator according to one or more embodiments of the present invention. Method 500 begins at process block 510 where the application 200 issues the paste operation 260. However, the EA referencing the send window 262 has been unmapped or invalidated as a result of having the application's access to the credit removed as described above in association with FIG. 3. Next, in process block 520, the application 200 receives the fault because the request information copied into the buffer 258 cannot be pasted to the accelerator 12 because the EA referencing the send window 262 has been invalidated. At process block 530 the application 200 recognizes the fault and at process block 540 the application 200 handles the loss of access to the accelerator 12.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   an accelerator;
   a credit management system having credits made available for controlling access to the accelerator through a virtual accelerator switchboard (VAS), wherein the VAS provides send and receive windows for transmitting data between an application and the accelerator, and wherein the credits from the credit management system control access to the accelerator via the send and receive windows; and
   one or more processors for executing computer-readable instructions, the computer-readable instructions controlling the one or more processors to perform operations comprising:
      executing the application;
      registering the application for access to the accelerator via the credit management system, whereby the application is provided with an effective address (EA) referencing a send window at which to paste a request block (RB) for the accelerator, the RB comprising request information, the request information comprising a function to be performed, the EA referencing the send window, and an EA of a status block (SB) where a completion status is written by the accelerator;
      issuing a copy instruction to copy a cache-line comprising the request information into a copy buffer;
      outputting buffered data of the request information including the RB as a paste instruction to transfer contents of the copy buffer to the EA corresponding to the RB, wherein the paste instruction will be denied by the VAS if the send window does not contain a send credit or the receive window does not contain a receive credit;
      receiving the paste instruction at a buffer for delivery to the accelerator associated with the EA to preempt access to one credit associated with the application's access to the accelerator;
      identifying a credit to remove that satisfies a condition, the condition comprising a lowest quality of service guarantee credit with respect to one or more additional credits; and
      in response to determining that the credit is in use:
         marking the credit to fail upon receiving the request information; and
         unmapping the EA for the credit by deleting the EA from the send window such that both the VAS and the application can no longer identify the send window from the EA, thereby precluding the application from accessing the accelerator.

2. The system of claim 1, further comprising indicating to the application that the credit has been removed and access to the accelerator has been revoked.

3. The system of claim 1, wherein receiving the request information is in response to having received a request to perform one of the following system features:
   dynamic reconfiguration;
   live update; and
   live migration.

* * * * *